Dec. 29, 1964    L. G. BRETHAUER    3,162,996
BALANCE WHEEL

Filed Oct. 25, 1961    2 Sheets-Sheet 1

INVENTOR
Louis G. Brethauer,
BY Diggins + LeBlanc
ATTORNEYS

Dec. 29, 1964   L. G. BRETHAUER   3,162,996
BALANCE WHEEL
Filed Oct. 25, 1961   2 Sheets-Sheet 2
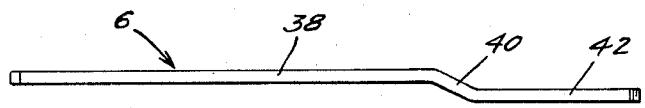
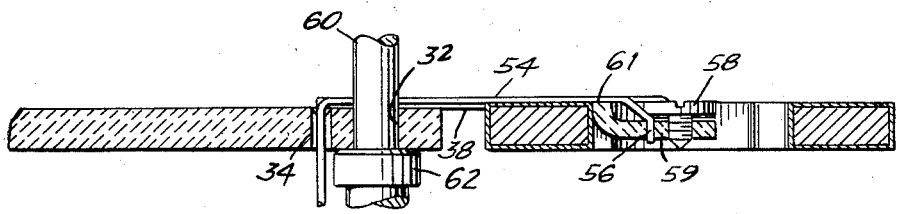
INVENTOR
*Louis G. Brethauer,*
BY
ATTORNEYS

United States Patent Office 3,162,996
Patented Dec. 29, 1964

3,162,996
BALANCE WHEEL
Louis G. Brethauer, Landisville, Pa., assignor to Hamilton Watch Company, Lancaster, Pa., a corporation of Pennsylvania
Filed Oct. 25, 1961, Ser. No. 147,616
4 Claims. (Cl. 58—28)

This invention relates to a balance wheel assembly for an electric watch and more particularly relates to a screwless balance wheel assembly for an electric watch.

In the type of battery operated electric watch disclosed in assignee's Patent No. 2,888,797, the train of the watch is driven by means of an impulse motor utilizing stationary permanent magnets and a coil mounted on the balance wheel. The coil is preferably a multi-turn coil of sector or pie shape having an open center portion and may be formed in the manner disclosed in assignee's copending application Serial No. 648,379, filed March 25, 1957, now Patent No. 3,063,136.

A number of assemblies have been proposed for mounting the coil on the balance wheel, many of which have been satisfactory in operation. All of these assemblies are, however, based on the use of a conventional balance wheel having balance screws for use in poising the assembly. Many of these assemblies use a solid balance wheel, while others, such as that shown in assignee's Patent No. 2,952,117 and assignee's copending application Serial No. 785,531, filed January 7, 1959, now abandoned, disclose the use of a balance wheel having the coil inserted in a cutaway section of the balance wheel rim. While these prior systems are satisfactory, the cost of material, parts, and manufacturing operations are considerable.

According to the present invention, it has now been found that a balance wheel can be provided that needs no balancing screws, is extremely simple of manufacture, and requires less material in its manufacture than has heretofore been necessary. This balance wheel can be directly placed on a balance shaft without the need of a balance hub, thus further increasing cost savings. The balance wheel thus provided is as reliable in operation as prior balance wheels, yet is simpler and less expensive to produce.

It is accordingly a primary object of the present invention to provide an improved screwless balance wheel.

It is another object of the present invention to provide a balance wheel which can be manufactured without the need of a turning operation.

It is another object of the invention to provide a balance assembly in which no balance hub is necessary.

It is another object of the present invention to provide a balance assembly in which the transfer of shock from the balance wheel to the coil and vice versa is at a minimum.

It is a further object of the invention to provide a balance wheel and coil assembly which permits of easy truing of the assembly.

It is a still further object of the present invention to provide a balance wheel for an electric watch in which electrical eddy current losses are minimized.

These and further objects and advantages of the invention will become more apparent upon reference to the following specification and claims and appended drawings wherein:

FIGURE 2 is an elevation view partly in section of the coil and balance wheel assembly of the present invention; and FIGURE 3 is a side elevation view of one of the coil attachments used in the balance wheel and coil assembly of FIGURES 1 and 2.

Figure 1:
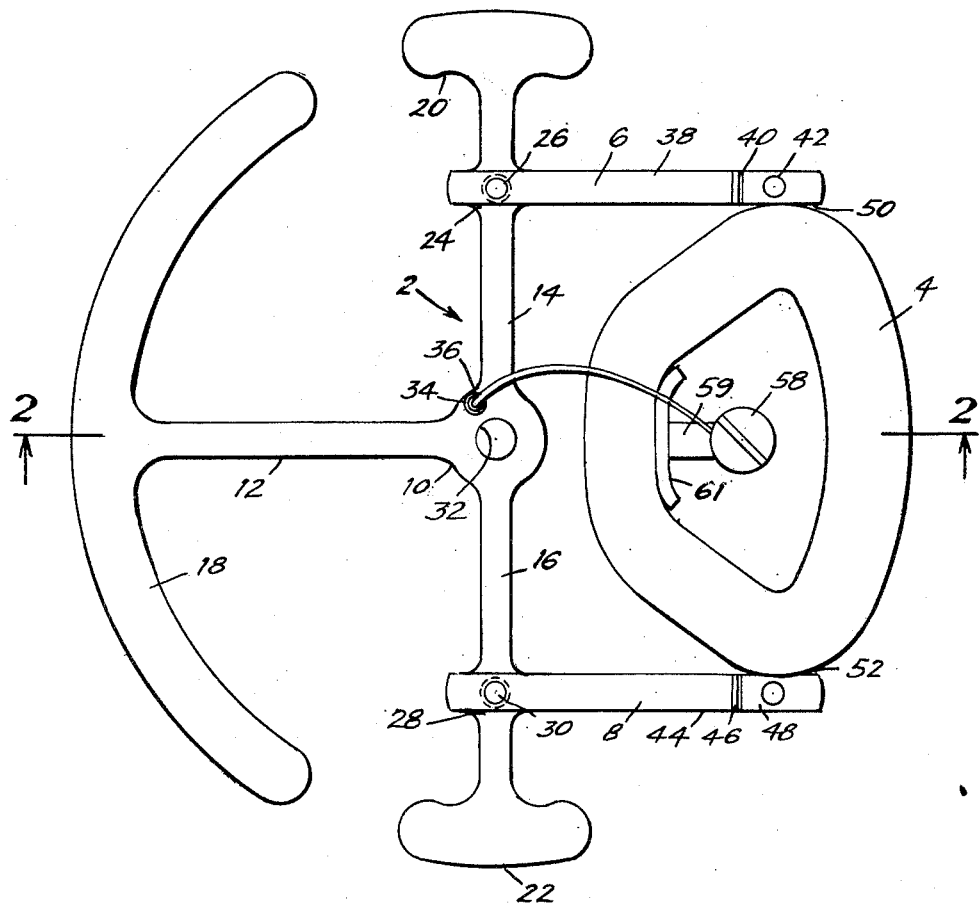
FIGURE 1 is a plan view of the balance wheel and coil assembly of the present invention.

Referring now to FIGURES 1 and 2, a coil 4 is mounted on a balance wheel, generally indicated at 2, by means of coil attachments 6 and 8. The balance wheel 2 has a central section or hub portion 10 from which a central arm 12 and two side arms 14 and 16 radiate. The central arm 12 is provided with an arcuate rim section 18. This rim section 18 is of sufficient weight, when taken together with the arm 12, to balance the weight of the coil 4. The side arms 14 and 16 are provided with a pair of symmetrical rim sections 20 and 22 respectively, the side arms 14 and 16 being preferably the same length as the arm 12, and the rim sections the same radial and axial dimensions as section 18 so that the sections all have the same radius of curvature. These sections aid in the balancing of the wheel and contribute to its total moment of inertia.

The side arm 14 is provided with a widened portion 24 which serves as a welding pad for the coil attachment. A hole 26 may be centrally located in this welding pad for use as a work hole in manufacturing operations. By use of such a widened welding pad it is possible to secure the attachment by two spaced welds for added rigidity. In a similar manner, the side arm 16 is provided with a widened portion 28 which acts as a welding pad for the coil attachment 8. A second work hole 30 may be located in this pad for use in manufacturing operations.

The central section 10 has a generally circular contour and is provided with a central aperture 32 for receiving the balance staff 60 of the assembly. The balance staff is provided with a larger diameter portion 62 upon which the central section 10 rests. This seat on the staff serves to provide a reference surface for proper wheel elevation and a flat surface to guarantee that the plane of the wheel is perpendicular to the balance staff axis. The construction of the wheel and staff in this manner eliminates the necessity of a separate balance hub. A second hole 34 is drilled in the central section 10 and acts as the coil lead wire hole. The contour of the central section is preferably distorted out around the hole 34 as shown at 36 to provide greater wall thickness between the hole 34 and the outer surface of the central section.

Referring to FIGURE 3, it can be seen that the coil attachment 6 has a first straight portion 38 extending parallel with the plane of the balance wheel, a sloping portion 40 extending downwardly, and an offset straight portion 42 which is parallel to the plane of the balance wheel but lies below the upper surface of the rim. In a similar manner, the coil attachment 8 is provided with a first straight portion 44, a sloping portion 46 and an offset portion 48. The portions 42 and 48 are fastened to the coil in any desired manner, such as by cement at 50 and 52. Because of the downward offset of the portions 42 and 48 the coil does not protrude above the balance wheel and thereby permits a thinner balance assembly. It is to be understood that these attachments may be made integral with the wheel and need not have an offset portion.

As best shown in FIGURE 2, a coil lead wire 54 is held in electrical connection with one end of the coil 56 by a screw 58 received in a connection bracket 59 having a rim like portion 61 adhesively secured to the inner edge of the coil with which it makes electrical contact. The coil lead wire 54 is passed through the coil lead hole 34 in the central section 10 of the balance wheel from which it is lead to the contact system of the watch not shown. The other end of the coil can be connected to the frame of the watch in any desired fashion, as, for example, through the attachment 6, side arm 14, central section 10, and balance staff 60 to the hairspring (not shown).

The procedure for producing the above described balance wheel is both simpler and more economical than any heretofore known with no reduction in operating quality. The design of this wheel enables it to be made by press operations, no turning operations being necessary. The wheel need only be blanked and pierced with the necessity of drilling only one hole, the coil lead wire hole. After blanking, the center hole and the outside shape of the wheel are shaved and the wheel is burnished and plated for the sake of appearance. Any other finishing process may, of course, be employed for this purpose. In the event that truing in any direction becomes necessary, the arms or rims sections may be individually bent easily, without special tools, and without disturbing the orientation of any of the others.

Poising of the wheel is accomplished by milling or drilling in the undersides of the rim sections. For this purpose, it is necessary that the weight of the rim sections and arms of a wheel which balance the coil always be heavier than the coil and coil attachments to be used in conjunction with it. As a safety precaution, the screw 58 may be supplied in two different weights. Originally, a 14 karat gold screw is used in the assembly. If the coil side of the balance wheel for some reason becomes too heavy, the screw can be replaced by an 8 karat gold screw, thus again enabling the wheel to be poised by milling or drilling in the rim sections. If desirable, a whole range of screw weights may be established and used in place of the two screw weights described.

The poising of the assembly by milling or drilling in the rim sections eliminates the necessity of using balance screws. This results in savings both through the elimination of the cost of the screws themselves and more importantly through the elimination of the delicate and time consuming operation of drilling and tapping the balance screw holes. Since no balance screws are used, the rim outside diameter of the wheel may be increased to the size of the maximum conventional wheel plus the balance screw head height. The rim sections thus counterbalance the coil assembly with the least possible weight and material and enable the wheel to achieve a better weight to moment of inertia ratio than could otherwise be obtained.

Expanding the rim section outside radius enables the rim section inside radius to be expanded, thus keeping the rim sections as far beyond the watch motor magnets as possible and minimizing electrical eddy current generation. Eddy current losses are further reduced by the use of rim sections rather than the solid rim used heretofore.

The construction of the balance wheel with a hole through which the coil lead wire may be passed eliminates the need for a balance hub and the balance wheel may be pressed directly into a friction fit with the seat of the balance staff with a resulting saving in cost.

The balance wheel of the present invention minimizes any transmission of shock from the balance wheel to the coil or from the coil to the balance wheel. Any such shock is alleviated by the coil attachments 6 and 8, and can also be partially absorbed by the radial arms and rim sections of the balance wheel due to their resiliency. The plural rim sections enable each section to move independently under a shock force and thus reduce the inertial force that would otherwise be transmitted to the balance wheel-coil connections, thus preventing any weakening of these connections.

It will be apparent from the foregoing that a balance wheel coil asembly has been provided that is effectively shock-proof, is simple and economical of manufacture, needs no balance screws for balancing, and presents an improved weight to moment of inertia ratio. This balance wheel-coil assembly is cheaper in assembly, requires fewer parts, and less material, and yet is as reliable in operation as more expensive assemblies.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a battery operated electric watch, a balance staff, said balance staff being provided with a seat, an integral balance wheel formed of a unitary piece of metal, said balance wheel having a central hub portion, said hub portion having an aperture therein for receiving said staff until said hub portion rests on said seat, a first arm extending radially outward from said hub portion, a first arcuate rim section free from tapped holes carried by said first arm, a second arm extending radially outward from said hub portion approximately perpendicular to said first arm, said second arm having a widened portion intermediate the ends thereof, a second arcuate rim section free from tapped holes carried by said second arm, said second rim section having a radius of curvature equal to said first rim section and an arcuate dimension less than said first rim section, a third arm extending radially outward from said hub portion in a direction substantially opposite to said second arm, said third arm having a widened portion intermediate the ends thereof, a third arcuate rim section free of tapped holes carried by said third arm, said first, second and third arcuate rim sections being spaced from each other about the periphery of said balance wheel, said third rim section being symmetrical with said second rim section, a coil, means for mounting said coil on said balance wheel, said mounting means comprising first and second attachments having offset portions, said first attachment having one end connected with said widened portion of said second arm, and the offset portion connected to the coil, said second attachment having one end connected to said widened portion of said third arm and the offset portion connected to said coil, said coil and coil mounting means being balanced solely by said arms and said rim sections.

2. The apparatus of claim 1 wherein said coil has a coil lead wire and said hub portion is provided with a second aperture through which the coil lead wire can be passed.

3. In a battery operated electric watch, a balance staff, said balance staff being provided with a seat, an integral balance wheel formed of a unitary piece of metal, said balance wheel having a central hub portion, said hub portion having an aperture therein for receiving said staff so that said hub portion rests on said seat, a first arm extending radially outward from said hub portion, a first arcuate rim section free from tapped holes carried by said first arm, a second arm extending radially outward from said hub portion approximately perpendicular to said first arm, a second arcuate rim section free from tapped holes carried by said second arm, said second rim section having a radius of curvature substantially equal to said first rim section and an arcuate dimension less than said first rim section, a third arm extending radially outward from said hub portion in a direction substantially opposite to said second arm, a third arcuate rim section free of tapped holes carried by said third arm, said first, second and third arcuate rim sections being spaced from each other about the periphery of said balance wheel, said third rim section being symmetrical with said second rim section, a coil, means for mounting said coil on said balance wheel, said mounting means comprising first and second attachments, said first attachment having one end connected with said second arm and its other end connected to the coil, said second attachment having one end connected to said third arm and the other end connected to said coil, said coil and coil mounting means being balanced solely by said arms and rim sections.

4. In a battery operated electric watch, a balance staff, said balance staff being provided with a seat, an integral balance wheel formed of a unitary piece of metal, said balance wheel having a central hub portion, said hub portion having an aperture therein for receiving said staff so that said hub portion rests on said seat, a first arm extending radially outward from said hub portion, a first arcuate rim section free from tapped holes caried by said first arm, a second arm extending outward from said hub portion at an angle to said first arm of no greater than approximately 90 degrees, a second arcuate rim section free from tapped holes carried by said second arm, said second rim section having a radius of curvature substantially equal to said first rim section and an arcuate dimension less than said first rim section, a third arm extending outward from said hub portion at an angle to said first arm of no greater than approximately 90 degrees, a third arcuate rim section free of tapped holes carried by said third arm, said first, second and third arcuate rim sections being spaced from each other about the periphery of said balance wheel, said third rim section being symmetrical with said second rim section, a coil means for mounting said coil on said balance wheel, said mounting means comprising first and second attachments, said first attachment having one end connected with said second arm and its other end connected to said coil, said second attachment having one end connected to said third arm and its other end connected to said coil, said coil and mounting means being balanced solely by said arms and rim sections.

References Cited in the file of this patent
UNITED STATES PATENTS

| | | |
|---|---|---|
| 1,048,072 | Hinkelman | Dec. 24, 1912 |
| 1,951,995 | Schaad | Mar. 20, 1934 |
| 2,116,257 | Aegler | May 3, 1938 |
| 2,291,455 | Dumaine et al. | July 28, 1942 |
| 2,495,858 | Marti | Jan. 31, 1950 |
| 2,665,546 | Van Haaften | Jan. 12, 1954 |
| 2,936,571 | Biemiller | May 17, 1960 |
| 3,015,206 | Detwiler et al. | Jan. 2, 1962 |

FOREIGN PATENTS

| | | |
|---|---|---|
| 89,273 | Switzerland | May 16, 1921 |
| 1,163,312 | France | Apr. 21, 1958 |
| 348,661 | Switzerland | Aug. 31, 1960 |